United States Patent
Uemura (10) Patent No.: US 10,740,890 B2
(45) Date of Patent: Aug. 11, 2020

(54) IMAGE PROCESSING APPARATUS, METHOD, AND STORAGE MEDIUM

(71) Applicant: CANON KABUSHIKI KAISHA, Tokyo (JP)

(72) Inventor: Takanori Uemura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 16/004,951

(22) Filed: Jun. 11, 2018

(65) Prior Publication Data
US 2018/0365821 A1 Dec. 20, 2018

(30) Foreign Application Priority Data
Jun. 14, 2017 (JP) .................................. 2017-116781

(51) Int. Cl.
*H04N 5/225* (2006.01)
*G06T 7/00* (2017.01)

(52) U.S. Cl.
CPC ......... *G06T 7/0004* (2013.01); *H04N 5/2256* (2013.01); *G06T 2207/10004* (2013.01); *G06T 2207/10152* (2013.01); *G06T 2207/20221* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 6,239,436 B1* | 5/2001 | Parker | ................ | G01N 21/8806 250/339.11 |
| 7,844,079 B2* | 11/2010 | Hassebrook | ....... | G01B 11/2513 345/582 |
| 8,416,491 B2* | 4/2013 | Chen | ................. | G02B 21/0032 359/368 |
| 9,726,540 B2* | 8/2017 | Popovich | ............. | G02B 5/1828 |

FOREIGN PATENT DOCUMENTS

| | | |
|---|---|---|
| JP | 11-271038 A | 10/1999 |
| JP | H11-271038 A | 10/1999 |
| JP | 2000-018932 A | 1/2000 |
| JP | 2000-111490 A | 4/2000 |
| JP | 2000-276599 A | 10/2000 |
| JP | 2003-057191 A | 2/2003 |
| JP | 2008-249397 A | 10/2008 |

(Continued)

*Primary Examiner* — Shadan E Haghani
(74) *Attorney, Agent, or Firm* — Canon U.S.A., Inc. IP Division (57) ABSTRACT

An image processing apparatus includes an illumination unit configured to project striped light on a target using a member in which a plurality of non-transmitting portions which does not transmit at least a part of incident light is arranged with a period P in a second direction, an imaging unit configured to image the target on which striped light is projected through the member, an image processing unit configured to process N images to generate a process image, and a driving unit configured to relatively displace the member and the target. The imaging unit performs imaging each time the member and the target are relatively displaced by the amount of change $\Delta X_i$ (i=1, 2, ... N) by the driving unit.

17 Claims, 9 Drawing Sheets

(56) References Cited

FOREIGN PATENT DOCUMENTS

| JP | 2008-292430 A | 12/2008 |
| JP | 2009-210509 A | 9/2009 |
| JP | 2013-505465 A | 2/2013 |
| JP | 2014-002125 A | 1/2014 |
| JP | 03197766 U | 6/2015 |
| JP | 2016-065839 A | 4/2016 |

* cited by examiner

IMAGE PROCESSING APPARATUS, METHOD, AND STORAGE MEDIUM

BACKGROUND OF THE INVENTION

Field of the Invention

An exemplary embodiment of the present disclosure relates to an image processing apparatus for acquiring and processing an image of a target, such as an optical evaluation apparatus for acquiring an image of a target having a glossy surface and optically evaluating the target, a method, and a storage medium.

Description of the Related Art

As a technique for detecting a defect existing on a surface of a workpiece which is a glossy target, a technique is known in which a workpiece is irradiated with light using a light source for emitting light in a periodical striped pattern, and light reflected by the workpiece is imaged by a camera. In an inspection method described in Japanese Patent Application Laid-Open No. 2014-002125, a workpiece is irradiated with light having luminance that changes periodically, an amplitude of a change in such luminance of an imaged reflected light image, an average value thereof, and the like are calculated, and a defect of the workpiece is detected from these values. In an inspection method described in Japanese Patent Application Laid-Open No. 2000-018932, a plurality of images is imaged by shifting light and dark patterns of light with which a workpiece is illuminated, an evaluation amount such as a maximum value or a minimum value in each of pixels is calculated, the evaluation amount is compared between the pixels, and a minute defect is thereby inspected.

SUMMARY OF THE INVENTION

An image processing apparatus according to an embodiment of the present disclosure includes an illumination unit configured to project striped light on a target using a member in which a plurality of non-transmitting portions which does not transmit at least a part of incident light is arranged with a period P at an interval in a second direction, wherein a length of each of the non-transmitting portions in the second direction is shorter than that in a first direction intersecting with the second direction, an imaging unit configured to image an image of the target on which striped light has been projected by the illumination unit, an image processing unit configured to process N images imaged by the imaging unit to generate a process image including information on a surface of the target, and a driving unit configured to relatively displace the member and the target in the second direction, wherein the imaging unit is disposed so as to image the target through the member, and wherein the imaging unit performs imaging each time the member and the target are relatively displaced in the second direction by the amount of change $\Delta X_i$ different from each other, except for a difference of integral multiples of the period P, by the driving unit, and the N images are acquired, where i=1, 2, ... N.

Further features of the present disclosure will become apparent from the following description of exemplary embodiments with reference to the attached drawings.

DESCRIPTION OF THE EMBODIMENTS

In inspection methods described in Japanese Patent Application Laid-Open No. 2014-002125 and Japanese Patent Application Laid-Open No. 2000-018932, a liquid crystal device (LCD) or a surface emitting light source to which a film in a line pattern form is attached is used as a light source for projecting a striped pattern on a workpiece. Each of these light sources does not transmit light, and therefore in a case of a reflective glossy workpiece, it is necessary to dispose the light source and a camera in different directions as seen from the workpiece. This is because, in a case where the light source and the camera are disposed on the same axis, light emitted from the light source is intercepted by the camera, or light reflected by the workpiece is intercepted by the light source, and the light hardly reaches the camera. In order to prevent a field of view of the camera from being intercepted by the light source, it is necessary to secure a long distance from the workpiece to the light source. In this case, in order to obtain specular reflected light from a wide range of the workpiece to the camera, it is necessary to use a large light source or to perform imaging in plurality of times by shifting a relative position of the workpiece to the camera and the light source using a robot arm or the like. In the former case, the size of an apparatus is increased. Particularly in a case where the workpiece has a curved surface, the workpiece works as a convex mirror or a concave mirror. Therefore, if a distance between the workpiece and the light source is large, a huge light source is required. In the latter case where the relative position is shifted, an apparatus becomes complicated and large, and measurement time is increased.

In view of the above issues, the present disclosure is directed to providing an image processing apparatus for acquiring and processing an image of a target, such as a relatively compact optical evaluation apparatus capable of optically evaluating a wide range of a glossy surface of a workpiece, and a method thereof.

In an image processing apparatus and a method according to an aspect of the present disclosure, striped light is projected on a target using a member which is long in a first direction and in which a plurality of non-transmitting portions which does not transmit at least a part of incident light is arranged with a period P at an interval in a second direction intersecting with the first direction. Then, the target on which the striped light has been projected is imaged through the member, and N images which have been imaged are processed to generate a process image including information on a surface of the target. At this time, imaging is performed each time the member and the target are displaced relatively in the second direction by the amount of change $\Delta X_i$ (i=1, 2, ... N) different from each other (except for a difference of integral multiples of the period P), and N images are acquired. Regarding the integer N, at least N=3 is preferable because there are three degrees of freedom (parameters) of a direct current (DC) component, an amplitude, and a phase of the following frequency component. However, in a case where it is possible to use less parameters, N=2 is also possible. A reason why the amount of change $\Delta X_i$ excludes a difference of integral multiples of the period P is that the positions of the member and the target relative to each other are equal in these cases. A driving unit can displace the relative position between the member and the target in the second direction. Typically, a process image is generated from N images using information on a change in intensity of a frequency component having a phase shifted by $4\pi\Delta X_i/P$ radians. Regarding this frequency component, in a case where the target is a plane, a striped pattern with a period of ½ of the period P is generated. However, in a case where the target is a curved surface, the phase is shifted by $4\pi\Delta X_i/P$ radians, but in general, the period is not ½ of P. At least one of an amplitude, a phase, and a phase difference of the frequency component can be acquired from the information on the change in intensity, and at least one of an amplitude image, a phase image, and a phase difference image can be generated as a process image. For example, a defect on a surface of a target can be detected based on the process image.

Hereinafter, exemplary embodiments of the present disclosure will be described with reference to the attached drawings. Incidentally, in each of the drawings, the same member or element is denoted by the same reference numeral, and duplicate description is omitted or simplified.

Figure 1:
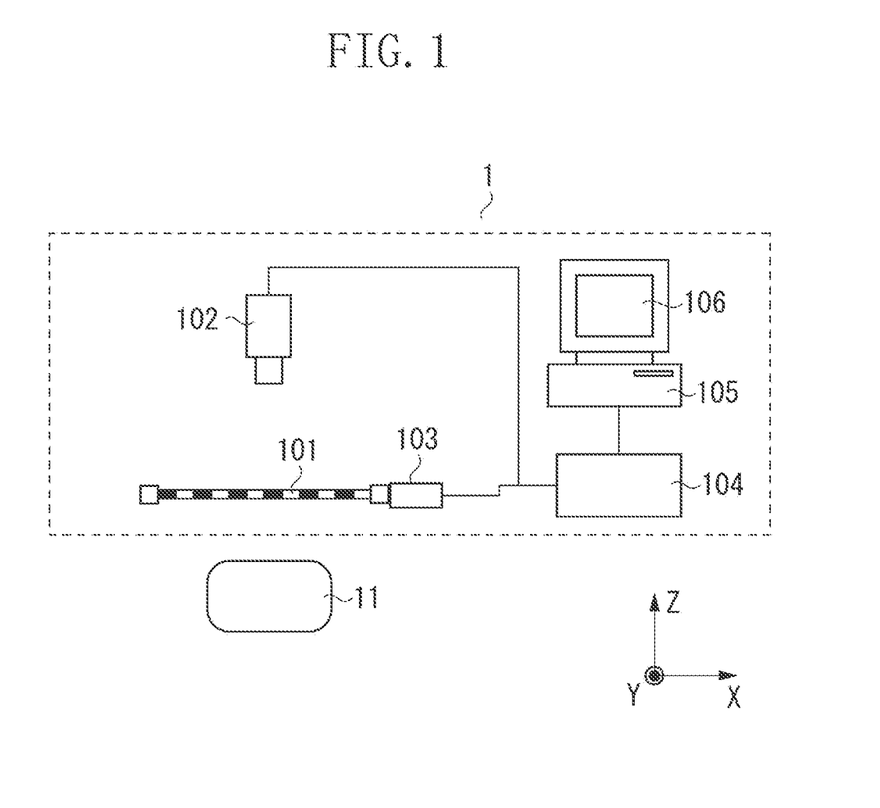
FIG. 1 is a schematic view illustrating an example of an apparatus according to an aspect of the present disclosure.

An optical evaluation apparatus 1 which is an apparatus for processing an image of a target (workpiece) according to a first exemplary embodiment will be described. FIG. 1 is a schematic view illustrating the optical evaluation apparatus 1. The optical evaluation apparatus 1 optically evaluates a glossy surface of a workpiece 11 (target). The workpiece 11 is, for example, a metal component or a resin component whose surface used for an industrial product has been polished. On the surface of the workpiece 11, various defects such as a defect caused by a gentle uneven shape, such as a dent, may be generated in addition to a scratch and color loss. The optical evaluation apparatus 1 acquires an image on the surface of the workpiece 11, evaluates process image information obtained by processing the image, thereby detects a defect thereof, and sorts the workpiece 11, for example, into a non-defective object or a defective object based on the detection result. The optical evaluation apparatus 1 can include a convey device (not illustrated) for conveying the workpiece 11 to a predetermined position (for example, a conveyer, a robot, a slider, or a manual stage).

The optical evaluation apparatus 1 can include an illumination unit 101 for illuminating the workpiece 11 and a camera 102 as an imaging unit for imaging the workpiece 11 from above through the illumination unit 101. As for the camera 102, an image sensor in which pixels are two-dimensionally arranged, such as a charge-coupled device (CCD) image sensor or a complementary metal oxide semiconductor (CMOS) image sensor, can be used. By using such an area sensor camera, it is possible to collectively acquire images in a wider region than a case of using a line sensor camera, and therefore it is possible to evaluate the surface at high speed for a wide range of the surface of the workpiece.

Figure 2:
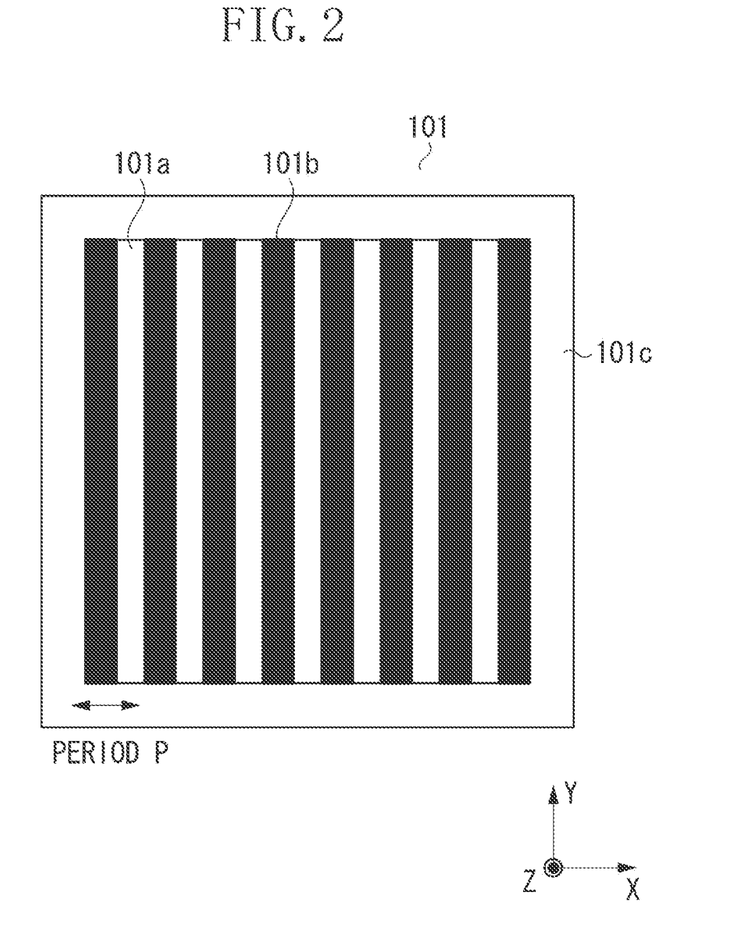
FIG. 2 is a view for explaining an illumination unit.

FIG. 2 is a view for explaining the illumination unit 101. In the present exemplary embodiment, the illumination unit 101 includes a member in which a plurality of transmitting portions 101a extending in a first direction and a plurality of non-transmitting portions 101b having lower light transmittance than the transmitting portions 101a and also extending in the first direction are alternately arranged with a period P in a second direction intersecting with the first direction. Each of the transmitting portions can be a space or an aperture. Including also such a case, the member can be defined as a member which is long in a first direction and in which a plurality of non-transmitting portions which does not transmit at least a part of incident light is arranged with a period P at an interval in a second direction intersecting with the first direction. The member including the transmitting portions 101a and the non-transmitting portions 101b is supported by a frame 101c.

Figure 3:
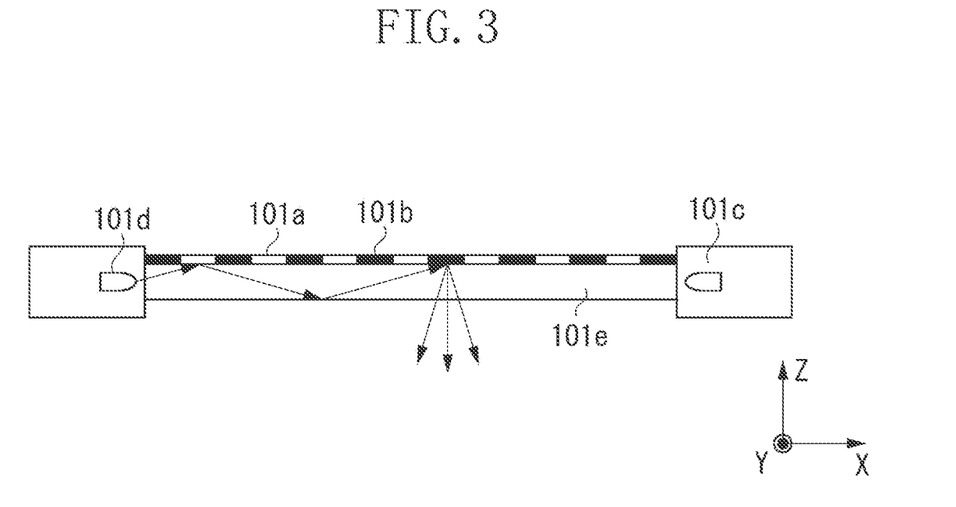
FIG. 3 is a cross-sectional view for explaining an illumination unit according to a first exemplary embodiment.

FIG. 3 is a cross-sectional view of one form of the illumination unit 101. The illumination unit 101 can further include a light-emitting diode (LED) 101d as a light source and a light guide plate 101e. The light guide plate 101e is, for example, a flat plate made of acrylic or glass. The non-transmitting portion 101b can be realized by printing a striped pattern on a film with a period P using, for example, a material having a characteristic of scattering light. In such a case, a film portion on which printing is not performed using the light-scattering material serves as the transmitting portion 101a. The film on which the pattern has been printed is closely attached to the light guide plate 101e. The LEDs 101d are disposed in a plurality of appropriate positions in a region surrounding the transmitting portions 101a and the non-transmitting portions 101b inside the frame 101c. Light emitted from the LED 101d travels inside the light guide plate 101e while being totally reflected. A material having a characteristic of scattering light is used for the non-transmitting portion 101b, so that a part of incident light is scattered toward the workpiece 11. Meanwhile, light is hardly scattered in the transmitting portion 101a, so that light emitted from the transmitting portion 101a toward the workpiece 11 is hardly generated. Therefore, striped pattern light is projected on the workpiece 11 by the illumination unit 101. A part of light reflected or scattered by the workpiece 11 is intercepted by the non-transmitting portion 101b of the illumination unit 101, and a part thereof is transmitted through the transmitting portion 101a of the illumination unit 101. By imaging the transmitted light with the camera 102, the camera 102 can image the workpiece 11 through the illumination unit 101.

In the present exemplary embodiment, the transmitting portion 101a and the non-transmitting portion 101b are realized by a striped pattern printed on a film using a material having a characteristic of scattering light. However, the illumination unit is not limited to such a configuration. For example, the transmitting portion 101a can be constituted by a line-shaped aperture as described above, and the non-transmitting portion 101b can be constituted by a line-shaped light emitting member.

As illustrated in FIG. 1, the illumination unit 101 is supported by a movable mechanism 103 which is a driving unit. The movable mechanism 103 allows the illumination unit 101 to move in a direction (X direction in FIG. 1) orthogonal to the lines of the transmitting portion 101a and the non-transmitting portion 101b. In the present exemplary embodiment, the illumination unit 101 is moved by the movable mechanism 103. However, by moving the workpiece 11 with respect to the illumination unit 101, a relative position between the member of the illumination unit 101 and the workpiece 11 can be displaced. In addition, only the member including the transmitting portions 101a and the non-transmitting portions 101b can be moved without moving the entire illumination unit 101.

The movable mechanism 103 is connected to a control unit 104. The control unit 104 is constituted by a substrate including, for example, a central processing unit (CPU) or a memory, and controls the illumination unit 101, the camera 102, and the movable mechanism 103 in synchronism with one another. The control unit 104 controls the movable mechanism 103 and the camera 102 to cause the movable mechanism 103 to move the illumination unit 101 by $\Delta X_i$ (i=1, 2, . . . N) and to cause the camera 102 to image N images (N≥3). Here, $\Delta X_i$ can be set to an arbitrary value as long as being recognized. However, the configuration is not limited to such a configuration. For example, after the workpiece 11 is moved by manually operating the movable mechanism 103, the camera 102 can image the workpiece 11 with a manual trigger.

The optical evaluation apparatus 1 can further include a personal computer (PC) 105 as an image processing unit and a display 106. The PC 105 according to the present exemplary embodiment has a function of evaluating the surface of the workpiece 11 based on information relating to the N images obtained by the camera 102. The PC 105 and the control unit 104 need not be separated from each other, and the image processing unit 105 can be disposed integrally with the control unit 104. The image processing unit can be a machine dedicated to image processing instead of a general-purpose PC. An image imaged by the camera 102 is transferred to the PC 105 via a cable (not illustrated).

In the optical evaluation apparatus 1 according to the present exemplary embodiment, the camera 102 is focused on the top surface of the workpiece 11. A distance D from the transmitting portion 101a and the non-transmitting portion 101b to the workpiece 11 and an object side numerical aperture (NA) of the camera are set so as to satisfy the following expression.

$$D \times \tan(a\sin(NA))/P \geq 0.35$$

As a result of studies by the present inventor, it has been found that a striped pattern of a period P/2 (half of a period P for the transmitting portion 101a and the non-transmitting portion 101b) is generated on an image acquired by the camera 102 in a case where the above condition is set. A reason thereof will be explained with reference to FIG. 4.

Figure 4:
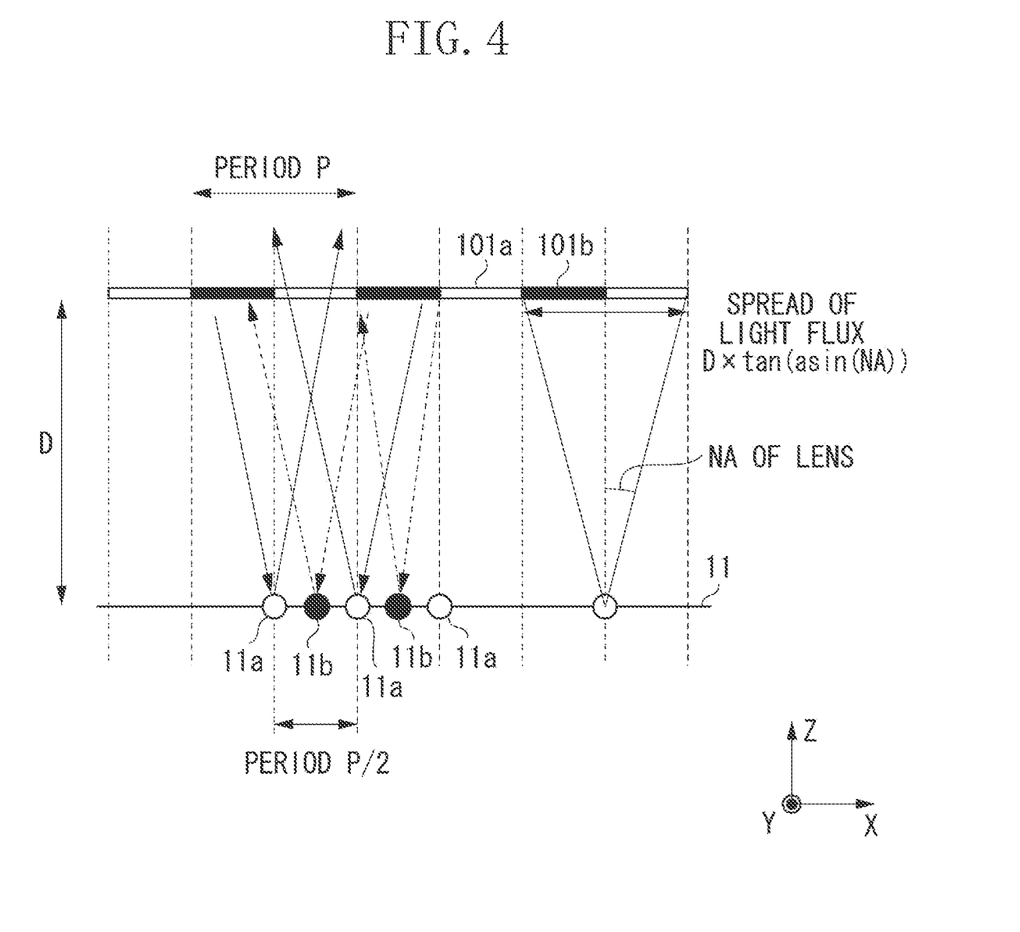
FIG. 4 is a diagram for explaining a striped pattern on an image.

FIG. 4 is a diagram for explaining a striped pattern on an image, obtained in a case where a striped pattern with a period P is projected on the workpiece 11 by the illumination unit 101 and the workpiece 11 is imaged by the camera 102 through the illumination unit 101. Here, the distance D from the transmitting portion 101a and the non-transmitting portion 101b to the workpiece 11 and the object side NA of the camera 102 are set so as to satisfy D×tan (a sin (NA))/P=1. As a result, spread of a light flux imaging one point on the surface of the workpiece 11 in the transmitting portion 101a and the non-transmitting portion 101b coincides with the period P. In this way, the above conditional expression needs to be satisfied such that the spread of the light flux is sufficient with respect to the period P.

At a point 11a indicated by a white dot in FIG. 4, light scattered by the non-transmitting portion 101b and emitted to the workpiece 11 is reflected by the surface of the workpiece and then transmitted through the transmitting portion 101a. As a result, at the point 11a, a part of the reflected light passes through the illumination unit 101 and reaches the camera 102. Meanwhile, at a point 11b indicated by a black dot in FIG. 4, light scattered by the non-transmitting portion 101b and emitted to the workpiece 11 is reflected by the surface of the workpiece and then intercepted by the non-transmitting portion 101b. As a result, at the point 11b, the reflected light does not reach the camera 102. The period for the points 11a and 11b is P/2. Therefore, in a case where a striped pattern with a period P is projected on the workpiece 11 by the illumination unit 101 and the workpiece 11 is imaged through the illumination unit 101 by the camera 102, a striped pattern with a period P/2 is imaged.

In the optical evaluation apparatus 1 according to the present exemplary embodiment, the illumination unit 101 and the camera 102 can be disposed on the same axis. In addition, the illumination unit 101 can be disposed in the vicinity of the workpiece 11. Therefore, specular reflected light to the camera can be obtained in a wide range of the workpiece even with a small illumination, and a wide range of the surface can be optically evaluated. Particularly, in a case where the surface of the workpiece 11 is a curved surface, if a distance between the workpiece 11 and the illumination unit 101 is large, a huge illumination is required to obtain specular reflected light to the camera in a wide range of the workpiece. Accordingly, a large effect is obtained in the present exemplary embodiment in which the illumination unit 101 can be disposed in the vicinity of the workpiece. Therefore, compared with a conventional embodiment, it is possible to evaluate a wide range of the surface with a compact apparatus.

Figure 5:
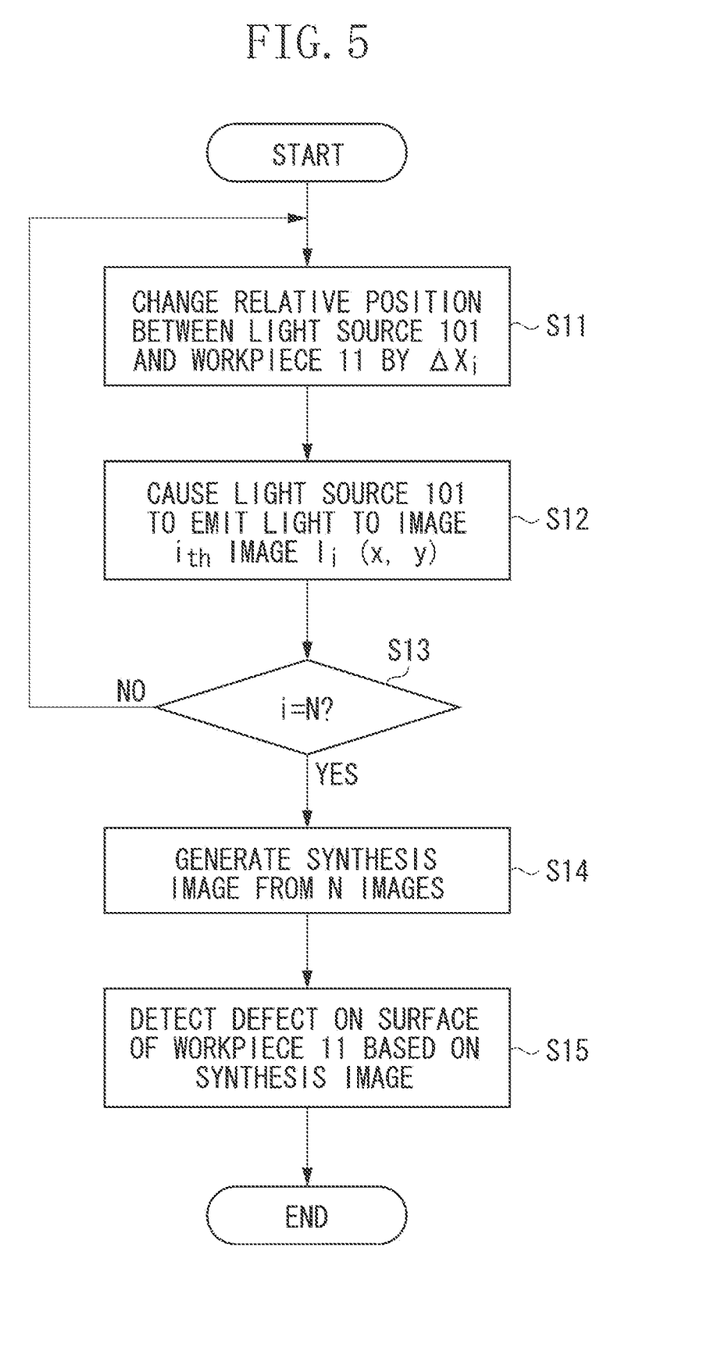
FIG. 5 is a flowchart illustrating a method for inspecting a defect on a surface of a workpiece.

FIG. 5 illustrates a method for inspecting a defect on a surface of a workpiece using the optical evaluation apparatus 1 according to the present exemplary embodiment. First, the illumination unit 101 is moved by the movable mechanism 103, and a relative position between the member of the illumination unit 101 and the workpiece 11 is changed by $\Delta X_1$ with respect to a reference position (step S11). Next, at this position, the illumination unit 101 is caused to emit light to image a first image $I_1$ (x, y) (step S12). Note that x and y represent positions of pixels on the image. Here, $\Delta X_1$ can be zero, and the first image can be at the reference position. Subsequently, the illumination unit 101 is moved by the movable mechanism 103, and a relative position between the member of the illumination unit 101 and the workpiece 11 is changed by $\Delta X_2$ with respect to the reference position (step S11). Then, at this position, the illumination unit 101 is caused to emit light to image a second image $I_2$ (x, y) (step S12). This operation is repeated N times to image N images in total.

When the relative position between the member of the illumination unit 101 and the workpiece 11 is changed by $\Delta X_i$, a synthesis image or a process image is generated from N images using information on a change in intensity of a frequency component having a phase shifted by $4\pi\Delta X_i/P$ radians (step S14).

An example of the synthesis image is an amplitude image of a frequency component having a phase shifted by $4\pi\Delta X_i/P$ radians (a frequency component corresponding to a striped pattern with a period P/2, generated on the image in a case where the workpiece is a plane). In a case where the relative position between the member of the illumination unit 101 and the workpiece 11 is shifted by a step of a P/N width, $\Delta X_i$ (i=1, 2, . . . N) is represented by the following expression.

$$\Delta X_i = (P/N) \times (i-1)$$

This expression includes a case where $\Delta X_1$ is zero. In a case where the first image is changed from the reference position, the expression is as follows.

$$\Delta X_i = (P/N) \times i$$

At this time, an amplitude image A(x, y) can be calculated by the following expression.

$$A(x,y) = \sqrt{I_{sin}^2(x,y) + I_{cos}^2(x,y)}$$

$$I_{sin}(x,y) = \Sigma_{n=0}^{n-1} I_{n+1}(x,y) \sin(4\pi n/N)$$

$$I_{cos}(x,y) = \Sigma_{n=0}^{n-1} I_{n+1}(x,y) \cos(4\pi n/N)$$

This is a process image including information on a surface of a target, obtained by processing N images, and a process image generated using information on a change in intensity of a frequency component having a phase shifted by $4\pi\Delta X_i/P$ radians.

When the position of the illumination unit 101 is moved, the positions of the bright point 11a and the dark point 11b illustrated in FIG. 4 are also moved. Therefore, brightness in intensity changes at one point on a pixel of the camera. In the glossy workpiece 11, in a portion having a surface with a normal gloss, an amplitude corresponding to a difference in brightness is generated. Meanwhile, scattered light other than specular reflected light is generated in a portion having a scattering defect, such as a scratch, minute unevenness, or surface roughness. When there is scattered light, a part of the scattered light is intercepted by the non-transmitting portion 101b at the point 11a, and therefore brightness is reduced. Meanwhile, a part of the scattered light passes through the transmitting portion 101a at the point 11b, and therefore brightness is increased. As a result, the difference in brightness becomes smaller, and a value of the amplitude also becomes smaller. For example, in a perfect diffusion surface, a scattering angle distribution of light does not depend on the angle of incident light. Accordingly, even if a striped pattern is projected on the workpiece 11 by the illumination unit 101, the scattering angle distribution of light is uniform all the time, and the amplitude is zero. Therefore, in the amplitude image, the degree of a scattering property can be evaluated as a surface property, and information on a defect in a scattering property, such as a scratch, minute unevenness, or surface roughness, can be obtained. Visualization is also possible.

Another example of the synthesis image is a phase image of a frequency component having a phase shifted by $4\pi\Delta X_i/P$ radians. An amplitude image θ (x, y) can be calculated by the following expression.

$$\theta(x, y) = \tan^{-1}\left(\frac{I_{sin}(x, y)}{I_{cos}(x, y)}\right)$$

The phase is calculated with a value of $-\pi$ to $\pi$ in the above expression. In a case where the phase changes more than these values, discontinuous phase skipping occurs in the phase image. Therefore, phase connection (phase unwrapping) is necessary as needed.

In the phase image, the inclination of the surface of the workpiece 11 can be evaluated as a surface property. Therefore, in the phase image, it is possible to obtain information on a defect caused by a gentle shape change such as a dent, surface tilting, or a depression on the surface. Visualization is also possible.

Various algorithms have been proposed for phase connection (phase unwrapping). However, in a case where an image noise is large, an error may be generated. In order to avoid phase connection, a phase difference corresponding to a differential of the phase can be calculated. Phase differences $\Delta\theta_x(x, y)$ and $\Delta\theta_y(x, y)$ can be calculated by the following expressions.

$$\Delta\theta_x(x, y) = \tan^{-1}\left(\frac{I_{cos}(x, y)I_{cos}(x-1, y) + I_{sin}(x, y)I_{sin}(x-1, y)}{I_{sin}(x, y)I_{cos}(x-1, y) - I_{cos}(x, y)I_{sin}(x-1, y)}\right)$$

$$\Delta\theta_y(x, y) = \tan^{-1}\left(\frac{I_{cos}(x, y)I_{cos}(x, y-1) + I_{sin}(x, y)I_{sin}(x, y-1)}{I_{sin}(x, y)I_{cos}(x, y-1) - I_{cos}(x, y)I_{sin}(x, y-1)}\right)$$

A still another example of the synthesis image is an average image. An average image $I_{ave}(x, y)$ can be calculated by the following expression.

$$I_{ave}(x, y) = \frac{1}{N}\sum_{n=1}^{N} I_n(x, y)$$

In the average image, a distribution of a reflectance can be evaluated as a surface property. Therefore, in the average image, it is possible to obtain information on a defect having a difference in reflectance from a normal portion, such as color loss, contamination, or an absorptive foreign matter. Visualization is also possible.

As described above, an optically evaluable surface property is different among the amplitude image, the phase image or the phase difference image, and the average image. As a result, a visualized defect is also different there among. Therefore, by combining these images, various surface properties can be evaluated, and various defects can be visualized.

By the way, the number N of images has an influence on calculation accuracy of the amplitude image and the phase image or the phase difference image. An example of the number of images is N=6. In this case, a component having a phase shifted by $4\pi\Delta X_i/P$ radians is defined as a second order frequency component (the phase is shifted by two periods by moving a relative position between the member of the illumination unit 101 and the workpiece 11 by one pitch, and therefore this component is defined as the second order frequency component). At this time, influences of the first, third, fifth to seventh, and ninth order frequency components can be removed. Meanwhile, the fourth, eighth, and tenth order frequency components generate errors in a calculation result of the amplitude and the phase or the phase difference.

Another example of the number of images is N=8. In this case, influences of the first, third to fifth, and seventh to ninth order frequency components can be removed. Meanwhile, the sixth and tenth order frequency components generate errors in a calculation result of the amplitude and the phase or the phase difference.

Another example of the number of images is N=10. In this case, influences of the first, third to seventh, ninth, and tenth order frequency components can be removed. Meanwhile, the eighth order frequency component generates an error in a calculation result of the amplitude and the phase or the phase difference.

As described above, as the number N of images is increased, it is possible to reduce an error generated by a high-order frequency component during calculation of the amplitude and the phase or the phase difference. Meanwhile, as the number N of images is increased, measurement time is increased. Therefore, the number N of images is determined according to the degree of generation of noise and required accuracy.

In the present exemplary embodiment, the phase is shifted by a step of $2\pi/N$ radians, but the present invention is not limited to such a case. For example, with N=5, five images can be imaged by shifting the phase by $2\pi/6$ radians. In this case, it is possible to calculate a secondary amplitude and phase by removing influences of the first and third order frequency components. The shift amount of the phase need not be at equal intervals.

In a case where a relative position between the workpiece 11 and the member of the illumination unit 101 is shifted at equal intervals, the camera 102 can image an image at a constant period while the movable mechanism 103 scans the illumination unit 101 at a constant speed. In this case, it is possible to reduce acceleration/deceleration time required for moving the illumination unit 101 as compared with a case where imaging is performed in a stationary state after the illumination unit 101 is moved. In addition, an error generated by a high-order frequency component can be reduced because the stripes on the image are smoothed.

Returning to FIG. 5, finally, a defect on the surface of the workpiece 11 is detected from the synthesis image (step S15). Various defects are visualized in the synthesis image. Therefore, various defects are detected in this step, and for example, defectiveness determination inspection of the workpiece 11 can be performed with high accuracy.

For simplicity, FIG. 4 illustrates a case where a lens is a telecentric optical system. Even in a case where the lens is a non-telecentric optical system, a striped pattern with a period P/2 is imaged similarly. However, as a result of studies by the present inventor, the following has been found. That is, in a case where the lens is a non-telecentric optical system, when a relative position between the member of the illumination unit 101 and the workpiece 11 is moved by $\Delta X_i$, the phase is shifted by $4\pi\Delta X_i/P$ radians, but a noise component in which the period of the stripe on the image is not P/2 may be generated. This is because a light flux directed to the workpiece and a light flux from the workpiece have different magnifications from each other. If such a noise component is present, even in a portion of the workpiece 11 having a normal surface, a striped intensity noise is generated on a synthesis image.

As a result of studies by the present inventor, it has been found that three methods to be described below are effective as a method for reducing such a noise component.

Figure 6:
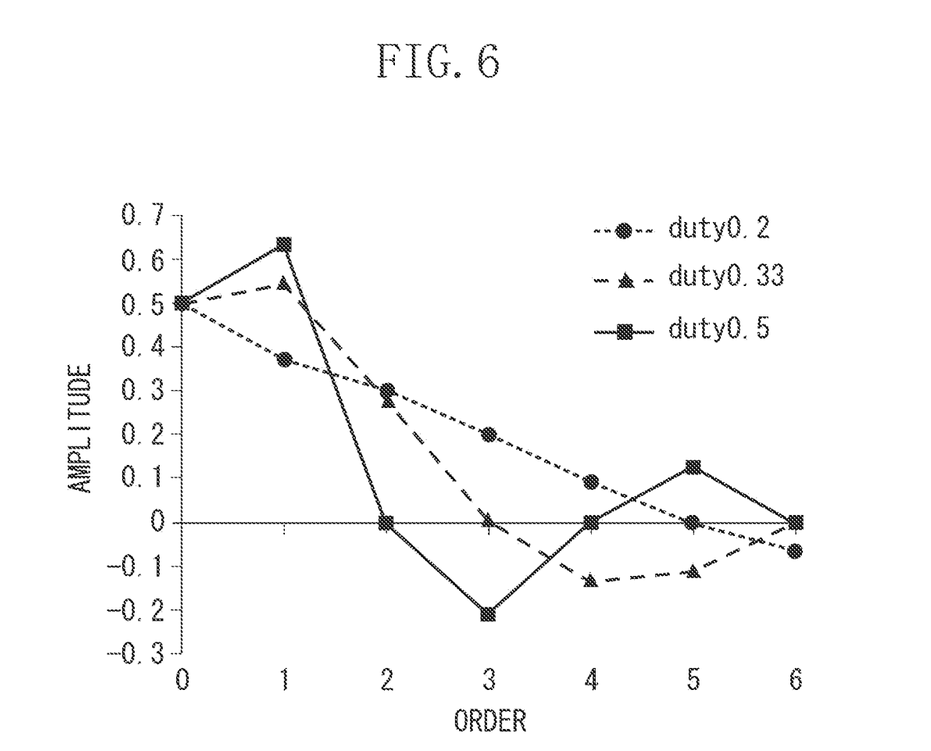
FIG. 6 is a graph for explaining a relationship between a ratio in width between a transmitting portion and a non-transmitting portion and a noise.

The first method is to set a ratio between the width of the non-transmitting portion 101b and the period P (ratio of the former to the latter) to 33% or more and 67% or less, preferably to set a ratio between the width of the non-transmitting portion 101b and the period P to 1 (to make the widths of the transmitting portion 101a and the non-transmitting portion 101b the same). The reason thereof will be explained with reference to FIG. 6. If an intensity distribution of illumination light is expanded in Fourier series for the illumination unit 101 in which the transmitting portions 101a and the non-transmitting portions 101b are alternately arranged at the period P, not only the period P but also a high-order frequency component is generated. This also applies to a member in which a plurality of non-transmitting portions is arranged with the period P at an interval, including a case where each of the transmitting portions is a space or an aperture. If there is a component that changes secondarily in the light intensity distribution of the illumination light (a frequency component in which the phase is shifted by two periods by moving a relative position between the member of the illumination unit 101 and the workpiece 11 by one pitch), the following occurs. When the relative position between the member of the illumination unit 101 and the workpiece 11 is moved by $\Delta X_i$, a noise component having a phase shifted by $4\pi\Delta X_i/P$ radians is obtained. FIG. 6 illustrates examples in which the ratios of the width of the transmitting portion 101a to the period P are 20% (dotted line), 33% (dashed line), and 50% (solid line). In a case where the ratio of the width of the transmitting portion 101a to the period P is 20%, if the magnitude of a first order frequency component (a frequency component in which the phase is shifted by one period by moving a relative position between the member of the illumination unit 101 and the workpiece 11 by one pitch) is 0.37, a second order frequency component of 0.30 is generated. Meanwhile, in a case where the ratio of the width of the transmitting portion 101a to the period P is 33%, if the magnitude of the first order frequency component is 0.55, the magnitude of the second order frequency component becomes 0.28 and can be suppressed to a half of the first order frequency component. In a case where the ratio of the width of the transmitting portion 101a to the period P is 50%, the second order frequency component is zero. Therefore, by setting the ratio of the width of the transmitting portion 101a to the period P to 33% or more and 67% or less, preferably by setting the ratio of the width of the transmitting portion 101a to the width of the non-transmitting portion 101b to 1, generation of a noise component can be reduced. The same applies even to a case where a preferable range is defined as a range in which the ratio of the width of the non-transmitting portion 101b to the period P is 33% or more and 67% or less.

The second method is to focus the camera 102 on a position having a distance within $\pm D/2$ from the surface of the workpiece 11, preferably to focus the camera 102 on the surface of the workpiece 11, if a distance from the transmitting portion 101a and the non-transmitting portion 101b to the surface of the workpiece 11 is D. When a relative position between the workpiece 11 and the member of the illumination unit 101 is moved by $\Delta X_i$, as the focus is shifted from the surface of the workpiece 11, the phase is shifted by $4\pi\Delta X_i/P$ radians and a signal component generated with a period P/2 becomes smaller. Meanwhile, as the focus approaches the illumination unit 101 or an image of the illumination unit imaged on the workpiece 11, the phase is shifted by $4\pi\Delta X_i/P$ radians, but a noise component in which the period of the stripe on the image is not P/2 is increased. Therefore, by focusing the camera on a position having a distance within $\pm D/2$ from the surface of the workpiece 11, preferably by focusing the camera on the surface of the workpiece 11, generation of a noise component can be reduced.

Incidentally, in a case where the surface of the workpiece 11 is a plane, if the camera is focused on the image of the illumination unit 101 imaged on the workpiece 11, the following occurs. When a relative position between the workpiece 11 and the member of the illumination unit 101 is moved by $\Delta X_i$, a frequency component having a phase shifted by $2\pi\Delta X_i/P$ radians is dominant. In this case, it is possible to generate a synthesis image such as an amplitude image or a phase image from information on the frequency component having a phase shifted by $2\pi\Delta X_i/P$ radians. However, in this case, the focus is not aligned with the surface of the workpiece 11, so that a minute defect on the surface of the workpiece 11 such as a scratch or a point defect cannot be visualized with high contrast due to a decrease in resolution. In a case where the surface of the workpiece 11 is a curved surface, the workpiece 11 acts as a convex mirror or a concave mirror, so that the illumination unit also needs to be a curved surface in order to focus the camera on the entire region of the image of the illumination unit imaged on the workpiece. However, it is not easy to manufacture an illumination unit with a curved surface.

Figure 7:
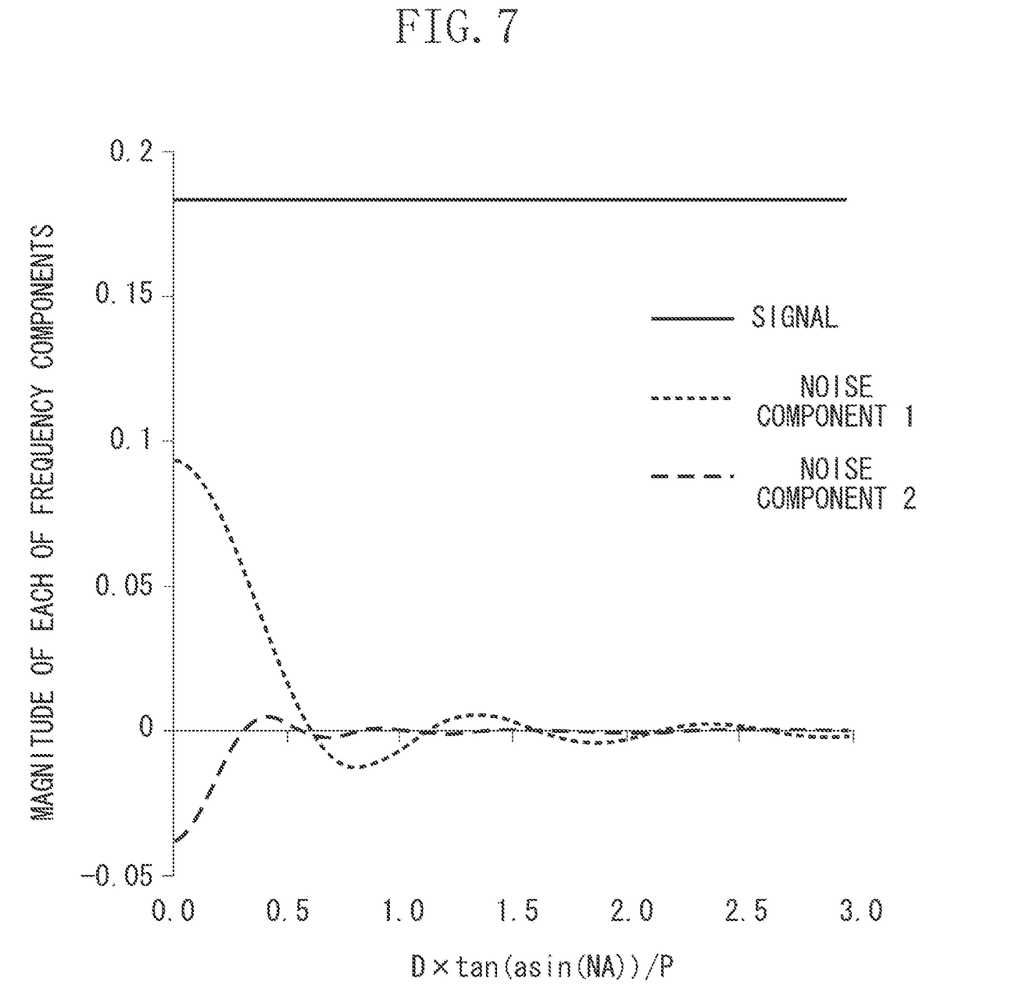
FIG. 7 is a graph for explaining a method for reducing a noise component.

The third method is to set D×tan (a sin (NA))/P≥0.35, preferably D×tan (a sin (NA))/P=1.11. The reason thereof will be explained with reference to FIG. 7. FIG. 7 is a graph illustrating a relationship between D×tan (a sin (NA))/P and a magnitude of each of frequency components in a case where the ratio of the width of the transmitting portion 101a to the period P is 40% and the focus is aligned with a top surface of the workpiece 11. FIG. 7 is a graph obtained by performing calculation assuming that the pupil of the camera 102 is circular. A noise component 1 is caused by a second order frequency component in an intensity distribution of illumination light. A noise component 2 is caused by a difference between the first and third order frequency components in the intensity distribution of illumination light.

FIG. 7 indicates that the magnitude of the noise component is reduced with oscillation as D×tan (a sin (NA))/P is increased. Regarding the noise component 1 having the largest influence, if D×tan (a sin (NA))/P≥0.35 is satisfied, the influence can be reduced to a half or less as compared with a case of D×tan (a sin (NA))/P=0. Further, if D×tan (a sin (NA))/P=1.11 is satisfied, the magnitude of each of the noise components 1 and 2 can be zero. Therefore, by setting D×tan (a sin (NA))/P≥0.35, preferably by setting D×tan (a sin (NA))/P=1.11, generation of a noise component can be reduced. Incidentally, the noise component is minimized when D×tan (a sin (NA))/P=1.11 is satisfied in a case where the pupil of the camera 102 is circular, and the noise component is minimized when D×tan (a sin (NA))/P=1 is satisfied in a case where the pupil has a square shape.

FIG. 4 indicates that the noise component is minimized when D×tan (a sin (NA))/P=1 is satisfied in one-dimensional calculation. Meanwhile, in two-dimensional calculation, the noise component is minimized when D×tan (a sin (NA))/P=1.11 is satisfied in a case of a circular aperture.

Figure 8A:
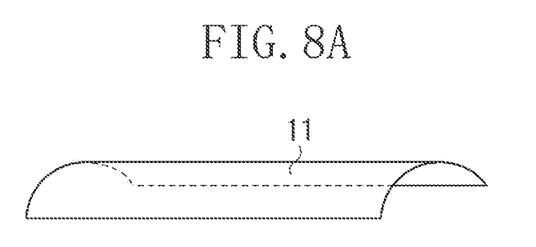
FIGS. 8A, 8B and 8C are views for explaining a preferable arrangement of a workpiece with a curved surface.
Figure 8B:
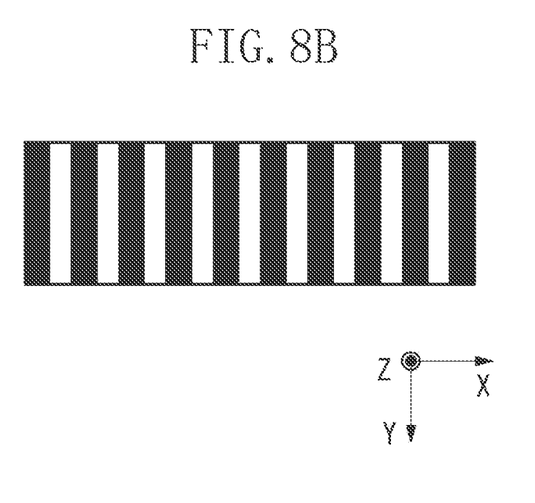
Figure 8C:
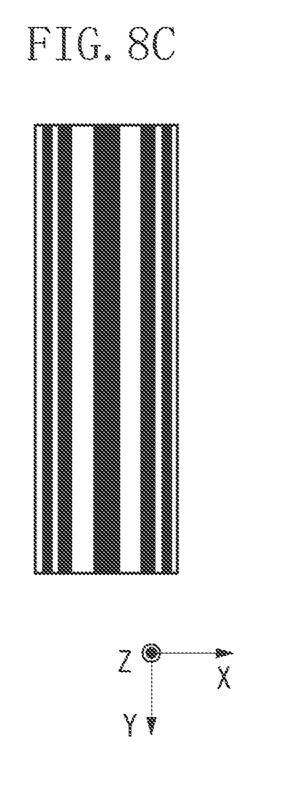

Now, a preferable arrangement relationship between the workpiece 11 and the illumination unit 101 in a case where the surface of the workpiece 11 has at least partly a curved surface, and a radius of curvature of the workpiece 11 varies depending on a direction will be described with reference to FIGS. 8A to 8C. FIG. 8A illustrates the surface shape of the workpiece 11 in a case where the surface of the workpiece 11 has a semi-cylindrical shape. FIG. 8B is a view illustrating an image imaged by the camera 102 in a case where a generatrix (a direction in which the radius of curvature of the curved surface is large) of the semi-cylindrical workpiece 11 is parallel to a direction orthogonal to the lines of the transmitting portions 101a and the non-transmitting portions 101b (referred to as a second direction). Under this condition, a striped pattern in an image imaged by the camera 102 has a uniform period. Meanwhile, FIG. 8C is a view illustrating an image imaged by the camera 102 in a case where the generatrix of the semi-cylindrical workpiece 11 is orthogonal to the second direction. Under this condition, a striped pattern in an image imaged by the camera 102 has a non-uniform period. Particularly, the striped pattern is dense at a portion where the surface of the workpiece 11 has a large inclination with respect to the camera 102, and the camera 102 cannot sufficiently resolve the pattern. In addition, as a result of studies by the present inventor, it has been found that a large noise component is generated in a case where a change in inclination of the surface of the workpiece 11 is large with respect to the second direction. Therefore, in a case where the surface of the workpiece has at least partly a curved surface and the radius of curvature varies depending on a direction, an image is desirably imaged in a state where the workpiece 11 is disposed such that a direction in which the radius of curvature is large is parallel to the second direction.

The optical evaluation apparatus 1 according to the present exemplary embodiment generates a synthesis image including information on the surface of the workpiece 11, detects a defect from the synthesis image, and performs, for example, defectiveness determination inspection of the workpiece 11. However, an application of an apparatus such as the optical evaluation apparatus 1 according to the exemplary embodiment of the present disclosure is not limited to detection of a defect on the surface of the workpiece 11. For example, an apparatus to which an exemplary embodiment of the present disclosure can be applied can be used for measuring the shape of the surface of the workpiece 11 using information on a phase image including information on the inclination of the surface of the workpiece 11. In addition, the apparatus to which an exemplary embodiment of the present disclosure can be applied can be used for measuring glossiness using information on an amplitude image including information on a scattering property of the surface of the workpiece 11.

An optical evaluation apparatus according to a second exemplary embodiment will be described. The optical evaluation apparatus according to the second exemplary embodiment is similar to the optical evaluation apparatus according to the first exemplary embodiment except the illumination unit.

Figure 9:
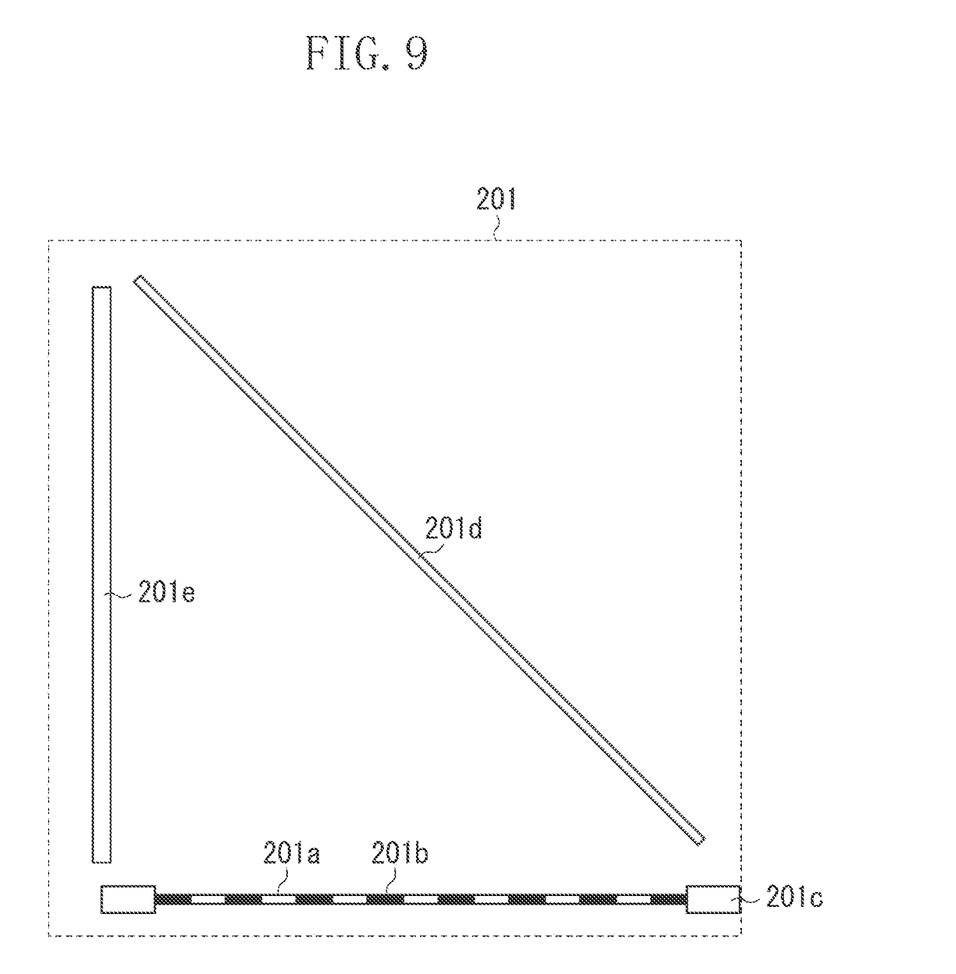
FIG. 9 is a view for explaining an illumination unit according to a second exemplary embodiment.

FIG. 9 is a view for explaining an illumination unit 201 of the optical evaluation apparatus according to the second exemplary embodiment. The illumination unit 201 includes a line-shaped transmitting portion 201a and a line-shaped non-transmitting portion 201b, and includes a member in which the transmitting portion 201a and the non-transmitting portion 201b are alternately arranged with a period P. The transmitting portion 201a and the non-transmitting portion 201b can be realized, for example, by providing a line-shaped aperture in a metal plate. In this case, the transmitting portion 201a is a line-shaped aperture or a space. The transmitting portion 201a and the non-transmitting portion 201b are supported by a frame 201c. The transmitting portion 201a and the non-transmitting portion 201b are movable in a direction orthogonal to the lines by a movable mechanism (not illustrated).

The illumination unit 201 further includes a half mirror 201d and a planar light source 201e. A part of light emitted from the planar light source 201e is reflected by the half mirror 201d and passes through the transmitting portion 201a (In a case where the transmitting portion is a space or an aperture, the phrase "through the transmitting portion" can also be expressed as a phrase "between the non-transmitting portions") to illuminate the workpiece 11 in stripes. A part of the light reflected and scattered by the workpiece 11 passes through the transmitting portion 201a again and is imaged by a camera.

The illumination unit 201 according to the second exemplary embodiment requires the half mirror 201d and is slightly larger than the illumination unit 101 according to the first exemplary embodiment. In the illumination unit 101 according to the first exemplary embodiment, the non-transmitting portion 101b functions as a secondary light source that scatters light in various directions, whereas in the illumination unit 201 according to the second exemplary embodiment, light that passes through the transmitting portion 201a to illuminate the workpiece 11 has directivity. In the second exemplary embodiment, in order to obtain specular reflected light having directivity from a wide range of the surface of the workpiece 11, an object side telecentric optical system is desirably used for a camera.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present exemplary embodiment, the imaging unit can image a target through the member of the illumination unit, and therefore it is possible to provide an image processing apparatus such as a relatively compact optical evaluation apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-116781, filed Jun. 14, 2017, which is hereby incorporated by reference herein in its entirety.

What is claimed is:

1. An image processing apparatus comprising:
an illumination unit configured to project bright and dark pattern light on a target using a member in which a plurality of light transmitting portions and a plurality of light non-transmitting portions of which transmittance is lower than the light transmitting portions are periodically arranged in a direction;
an imaging unit configured to image the target on which the pattern light is projected by the illumination unit;
an image processing unit configured to process N images imaged by the imaging unit to generate a process image including information on a surface of the target; and
a driving unit configured to relatively displace the member and the target in the direction, wherein the imaging unit obtains the image by receiving light which is reflected by the target and transmits through the light transmitting portion while the light non-transmitting portion blocks light which is reflected by the target and is incident on the light non-transmitting portion, and wherein the imaging unit performs imaging each time the member is displaced relatively to the imaging unit and the target in the direction by an amount of change $\Delta X_i$ different from each other by the driving unit, and obtains the N images, where i=1, 2, . . . N.

2. The image processing apparatus according to claim 1, wherein the plurality of light transmitting portions and the plurality of light non-transmitting portions are alternatively arranged with a period P in the direction, and wherein the image processing unit generates the process image from the N images using information on a change in intensity of a frequency component having a phase shifted by $4\pi\Delta X_i/P$ radians.

3. The image processing apparatus according to claim 2, wherein the image processing unit acquires at least one of an amplitude, a phase, and a phase difference of the frequency component from the information on the change in intensity and generates at least one of an amplitude image, a phase image, and a phase difference image as the process image.

4. The image processing apparatus according to claim 1, wherein a focus position of the imaging unit is set to a position having a distance within ±D/2 from a surface of the target, where D is a distance between the surface of the target and the member.

5. The image processing apparatus according to claim 4, wherein the imaging unit includes a non-telecentric optical system.

6. The image processing apparatus according to claim 1, wherein the plurality of light transmitting portions and the plurality of light non-transmitting portions are alternatively arranged with a period P in the direction, and wherein an object side numerical aperture (NA) of the imaging unit and the distance D between the target and the member satisfy the following expression:

$$D \times \tan(a \sin(NA))/P \geq 0.35.$$

7. The image processing apparatus according to claim 1, wherein the plurality of light transmitting portions and the plurality of light non-transmitting portions are alternatively arranged with a period P in the direction, and wherein a ratio of a width of the light non-transmitting portion to the period P is 33% or more and 67% or less.

8. The image processing apparatus according to claim 1, wherein the imaging unit includes an object side telecentric optical system.

9. The image processing apparatus according to claim 1, wherein the illumination unit includes the member and a light source disposed in a region surrounding the member.

10. The image processing apparatus according to claim 9, wherein the illumination unit forms the bright portion of the pattern light with light directed from the light source and scattered by the light non-transmitting portion.

11. The image processing apparatus according to claim 1, wherein the illumination unit includes the member, a half mirror, and a light source, and
wherein a part of light emitted from the light source is reflected by the half mirror, passes through the light transmitting portion, and illuminates the target in the pattern light, and a part of light reflected by the target passes through the light transmitting portion and is imaged by the imaging unit and the other part of light reflected by the target is blocked by the light non-transmitting portion.

12. The image processing apparatus according to claim 1, wherein the surface of the target has at least partly a curved surface, and
wherein the imaging unit images the N images in a state where the target is disposed such that the direction is parallel to a direction in which the radius of curvature of the curved surface is large.

13. The image processing apparatus according to claim 1, wherein the image processing unit detects a defect on the surface of the target based on the process image.

14. The image processing apparatus according to claim 1, wherein N≥3.

15. The image processing apparatus according to claim 1, wherein the plurality of light transmitting portions and the plurality of light non-transmitting portions are alternatively arranged with a period P in the direction, and wherein the imaging unit performs imaging each time the member is relatively displaced in the direction by the amount of change ΔXi different from each other, except for a difference of integral multiples of the period P, by the driving unit, and the N images are acquired, where i=1, 2, . . . N.

16. An image processing method comprising:
projecting bright and dark pattern light on a target with an illumination unit configured to project bright and dark pattern light on the target using a member in which a plurality of light transmitting portions and a plurality of light non-transmitting portions of which transmittance is lower than the light transmitting portions are periodically arranged in a direction, and imaging the target by receiving light which is reflected by the target and transmits through the light transmitting portion while the light non-transmitting portion blocks light which is reflected by the target and is incident on the light non-transmitting portion;
relatively displacing the member and the target in the direction; and
processing N images acquired by performing imaging in the projecting each time the member is displaced relatively to the target in the displacing to generate a process image including information on a surface of the target,
wherein, in the projecting, imaging is performed each time the relative displacement in the displacing is an amount of change $\Delta X_i$ different from each other and obtains the N images, where i=1, 2, . . . N.

17. A non-transitory storage medium storing a program causing a computer to perform image processing, the program causing the computer to perform:
projecting bright and dark pattern light on a target with an illumination unit configured to project bright and dark pattern light on the target using a member in which a plurality of light transmitting portions and a plurality of light non-transmitting portions of which transmittance is lower than the light transmitting portions are periodically arranged in a direction, and imaging the target receiving light which is reflected by the target and transmits through the light transmitting portion while the light non-transmitting portion blocks light which is reflected by the target and is incident on the light non-transmitting portion;
relatively displacing the member and the target in the direction; and
processing N images acquired by performing imaging in the projecting each time the member is displaced relatively to the target in the displacing to generate a process image including information on a surface of the target,
wherein, in the projecting, imaging is performed each time the relative displacement in the displacing is an amount of change $\Delta X_i$ different from each other and obtains the N images, where i=1, 2, . . . N.

* * * * *